(12) United States Patent
Hsieh (10) Patent No.: US 10,562,247 B2
(45) Date of Patent: Feb. 18, 2020

(54) METHOD FOR MANUFACTURING WATERPROOF ZIPPER

(71) Applicant: S.L. ZIPPER CO., Kaohsiung (TW)

(72) Inventor: Chen-Chou Hsieh, Kaohsiung (TW)

(73) Assignee: S.L. ZIPPER CO., Kaohsiung (TW)

( * ) Notice: Subject to any disclaimer, the term of this patent is extended or adjusted under 35 U.S.C. 154(b) by 81 days.

(21) Appl. No.: 15/659,101

(22) Filed: Jul. 25, 2017

(65) Prior Publication Data

US 2019/0030843 A1 Jan. 31, 2019

(51) Int. Cl.
*B29D 5/02* (2006.01)
*B29C 65/48* (2006.01)
*B29C 65/40* (2006.01)
*A44B 19/32* (2006.01)

(52) U.S. Cl.
CPC .............. *B29D 5/02* (2013.01); *B29C 65/40* (2013.01); *B29C 65/4815* (2013.01); *A44B 19/32* (2013.01)

(58) Field of Classification Search
CPC ... B29D 5/02; B29D 5/04; B29D 5/06; B29D 5/08; B29D 5/10; B29C 65/40; B29C 65/4815
See application file for complete search history.

(56) References Cited

U.S. PATENT DOCUMENTS

| 4,859,259 A * | 8/1989 | Scheibner | B29C 65/028 156/66 |
| 2004/0070111 A1* | 4/2004 | Hsieh | A44B 19/00 264/252 |
| 2007/0143971 A1* | 6/2007 | Ho | A44B 19/32 24/398 |
| 2016/0007695 A1* | 1/2016 | Hung | A44B 19/52 425/112 |
| 2017/0332744 A1* | 11/2017 | Kameyama | A44B 19/32 |

FOREIGN PATENT DOCUMENTS

WO WO-2016103426 A1 * 6/2016 ............. A44B 19/32

* cited by examiner

*Primary Examiner* — Christopher J Besler
(74) *Attorney, Agent, or Firm* — Muncy, Geissler, Olds & Lowe, P.C.

(57) ABSTRACT

A method for manufacturing waterproof zipper is completed in following steps. Firstly, a release paper is provided, a release side of which is provided with the shape, such as glossy surface, matte surface, figures, patterns, trademarks and characters, required by client. Afterwards, a liquid hot melt glue is applied to the release side, and a heating procedure is performed on the liquid hot melt glue. Subsequently, a zipper is provided, and a hot rolling procedure is performed on the zipper, release paper and liquid hot melt glue, one side of a zipper tape without zipper teeth being bound to the liquid hot melt glue and release paper by hot rolling, the liquid hot melt glue being formed as a waterproof layer. Finally, the release paper is peeled off, so as to form the shape on a surface of waterproof layer contacted with the release side, and complete the waterproof zipper.

7 Claims, 10 Drawing Sheets

METHOD FOR MANUFACTURING WATERPROOF ZIPPER

FIELD OF THE INVENTION

The present invention is related to a method for manufacturing zipper, particularly to a method for manufacturing waterproof zipper in which liquid hot melt glue is used to manufacture the zipper.

BACKGROUND OF THE INVENTION

Figure 1:
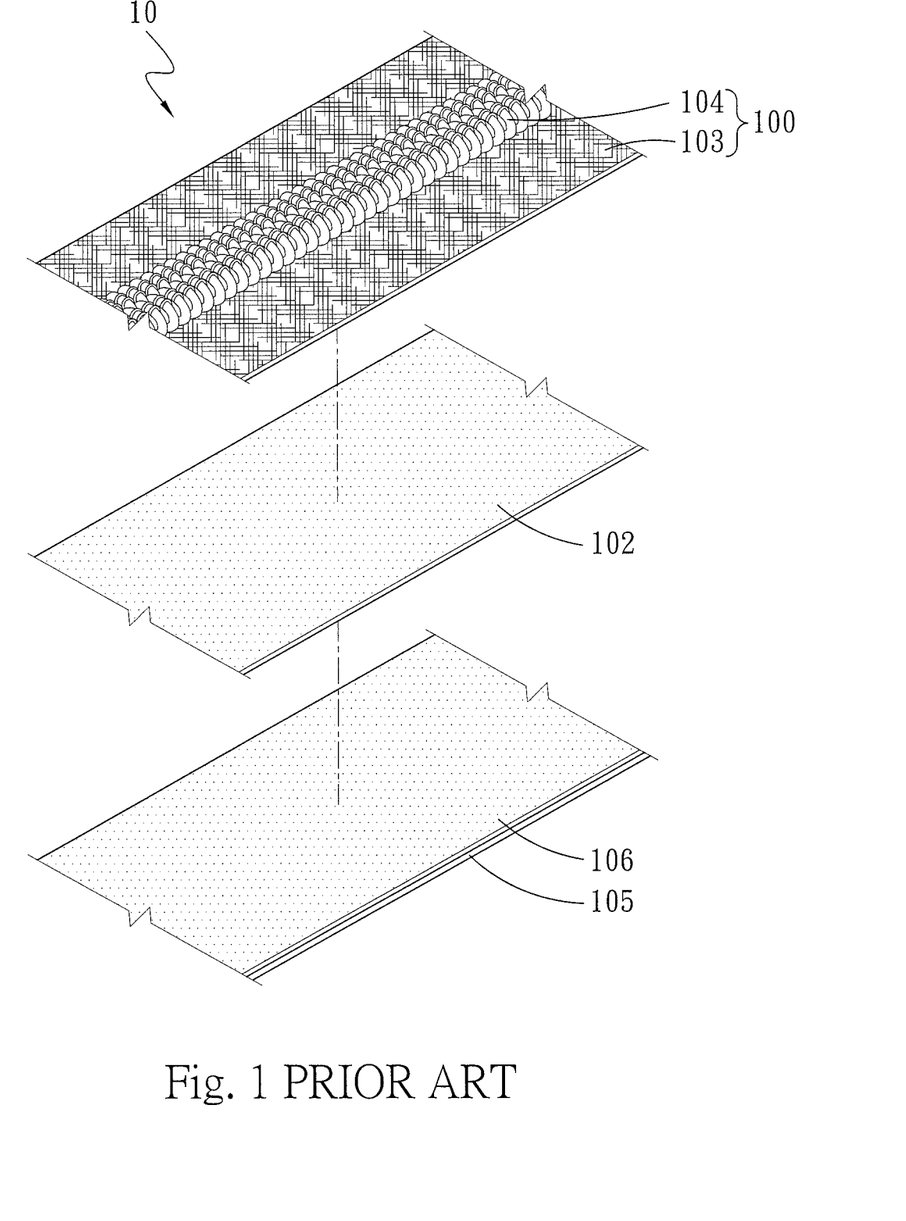
FIG. 1 is a perspective exploded view of an existing waterproof zipper structure.
Figure 2:
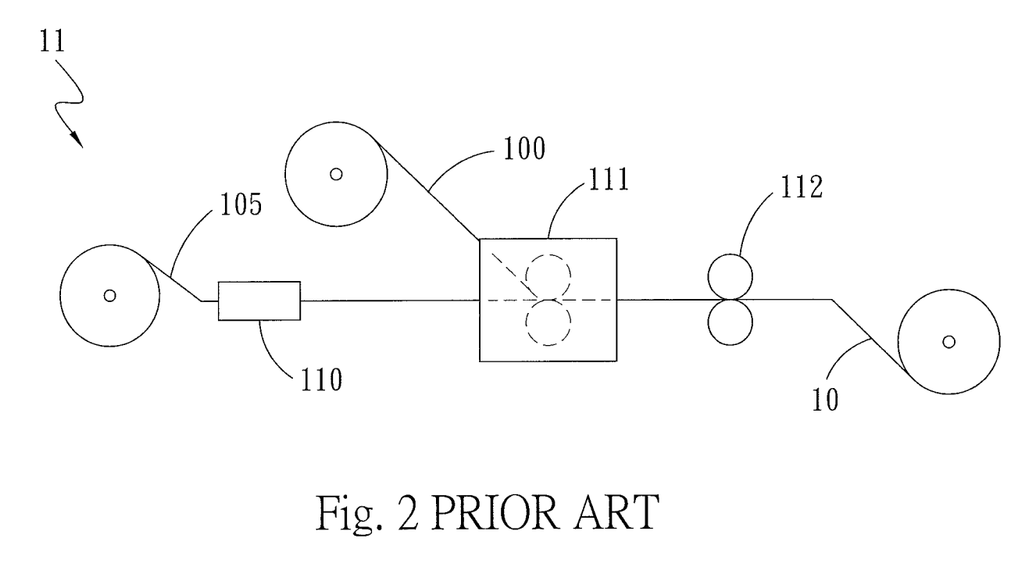
FIG. 2 is a diagram of manufacturing equipment for the existing waterproof zipper structure.
Figure 3:
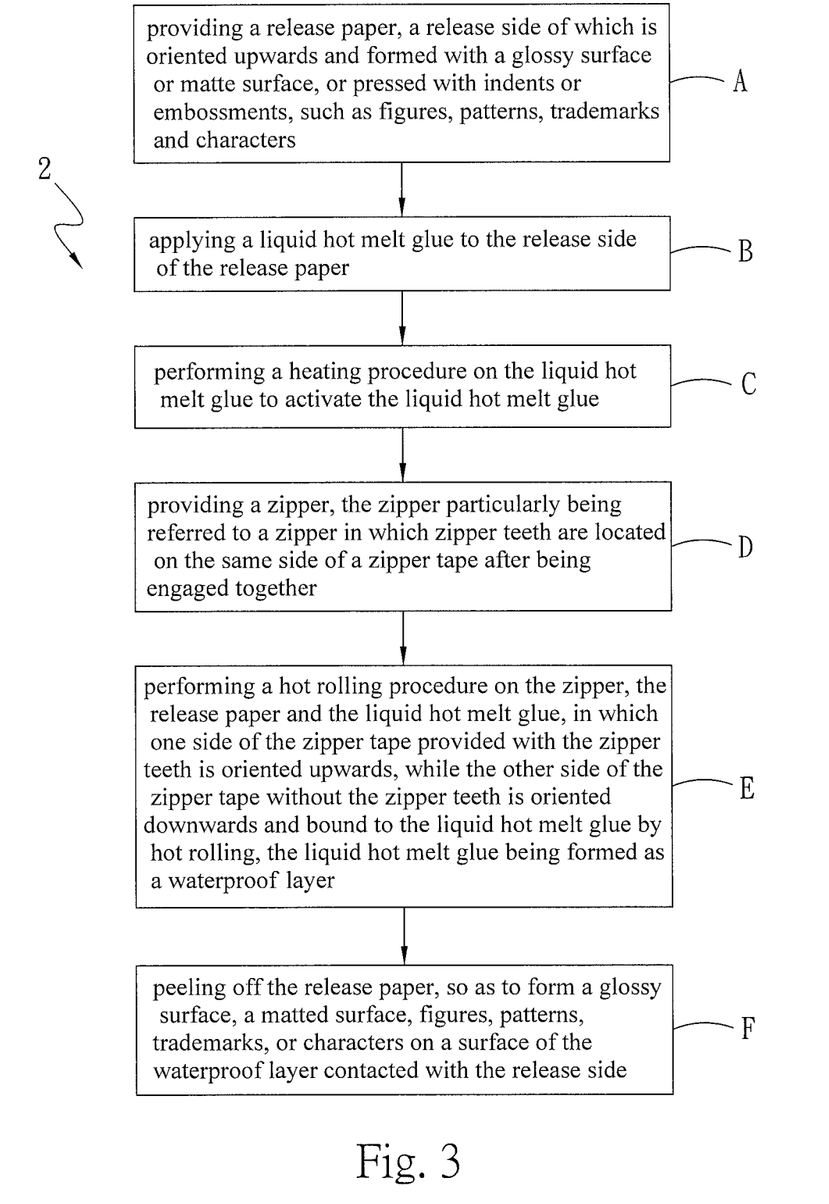
FIG. 3 is a flow chart (1) of a method for manufacturing waterproof zipper of the present invention.

Referring to FIGS. 1 and 2, there are shown an existing waterproof zipper structure 10 and a manufacturing equipment 11 therefor. The waterproof zipper structure 10 includes a zipper 100, a waterproof layer formed by a solid hot melt glue 106, and an adhesive layer 102. The zipper 100 includes a zipper tape 103, and a row of zipper teeth 104 provided at the center of the zipper tape 103 while located on one side of the zipper tape 103. In this case, the zipper teeth 104, after being engaged together, may be located on the same side of the zipper tape 103. The adhesive layer 102 is located between the other side of the zipper tape 103 without the zipper teeth 104, and the solid hot melt glue 106.

The manufacturing equipment 11 includes an application device 110, a hot rolling device 111, and a drawing device 112. A release paper 105 having the solid hot melt glue 106 is provided previously. Afterwards, the adhesive layer 102 is applied to the solid hot melt glue 106 by means of the application device 110. Then, the zipper 100, the adhesive layer 102, the solid hot melt glue 106, and the release paper 105 are hot rolled by means of the hot rolling device 111 so as to be adhered together. In this case, the adhesive layer 102 is located between the other side of the zipper tape 103 without the zipper teeth 104, and the solid hot melt glue 106. Finally, the release paper 105 is peeled off, in such a way that the waterproof zipper structure 10 is form, and the waterproof zipper structure 10 is wound via the drawing device 112.

It is not easy to adhere the solid hot melt glue 106 to the zipper tape 103, due to low degree of binding therebetween. Therefore, the adhesive layer 102 must be provided between the solid hot melt glue 106 and the zipper tape 103, in such a way that adhesion of the solid hot melt glue 106 to the zipper tape 103 is better.

After the adhesive layer 102 is cooled and solidified, however, the waterproof zipper structure is harder. The clothing, such as clothes, coats and etc., is less comfortable for a wearer, once the waterproof zipper structure 10 is mounted thereto.

In addition, a poor waterproof effect is also provided for the existing waterproof zipper structure 10, because only a little glue is permeated into the fiber fabric of the zipper tape 103 after the solid hot melt glue 106 is heated. Thereby, there is a need to improve the existing waterproof zipper 10 further.

SUMMARY OF THE INVENTION

It is the object of the present invention to provide a method for manufacturing a waterproof zipper with good waterproof effect and soft comfort by means of liquid hot melt glue.

In light of above object, the present invention provides a method for manufacturing waterproof zipper comprising the steps of:

Step A: providing a release paper, a release side of which is oriented upwards and formed with a glossy surface or matte surface, or pressed with indents or embossments, such as figures, patterns, trademarks and characters;

Step B: applying a liquid hot melt glue to the release side of the release paper;

Step C: performing a heating procedure on the liquid hot melt glue to activate the liquid hot melt glue;

Step D: providing a zipper, the zipper particularly being referred to a zipper in which zipper teeth are located on the same side of a zipper tape after being engaged together;

Step E: performing a hot rolling procedure on the zipper, the release paper and the liquid hot melt glue, in which one side of the zipper tape provided with the zipper teeth is oriented upwards, while the other side of the zipper tape without the zipper teeth is oriented downwards and bound to the liquid hot melt glue by hot rolling, the liquid hot melt glue being formed as a waterproof layer; and Step F: peeling off the release paper, so as to form a glossy surface, a matted surface, figures, patterns, trademarks, or characters on a surface of the waterproof layer contacted with the release side.

Further, the zipper teeth are provided as nylon teeth, metal teeth or plastic steel teeth.

Further, the liquid hot melt glue is provided as cryogenic liquid polyurethane (PU) glue.

Further, six heating boxes, having heating temperature set at 55° C., 55° C., 60° C., 85° C., 60° C. and 55° C., respectively, are provided in the heating procedure.

Further, the hot rolling procedure in Step E is performed by a first hot rolling device and a second hot rolling device for hot rolling the zipper, the release paper and the liquid hot melt glue, as well as the zipper and the release paper are turned over firstly, such that one side of the zipper tape provided with the zipper teeth is oriented downwards, while the other side of the zipper tape without the zipper teeth, the release paper and the waterproof layer are oriented upwards, between the first hot rolling device and the second hot rolling device.

Further, after Step F, the method further includes Step G: performing a water-repellent agent addition procedure on the zipper to enhance the waterproof effect of the zipper.

Further, the water-repellent agent addition procedure in Step G provides a water-repellent agent immersion device and a water-repellent agent spraying device for the addition of a water-repellent agent layer to the zipper.

Further, after Step U, the method further includes Step H: performing a cutting procedure on the waterproof layer formed by the liquid hot melt glue at the center in the axial direction thereof, and aligning a cutting location with the engagement of the zipper teeth.

DETAILED DESCRIPTION OF THE PREFERRED EMBODIMENTS

Referring to FIGS. 3, 5, 6 and 10, there are shown a method for manufacturing waterproof zipper 2 and a waterproof zipper product 3. In this connection, the method for manufacturing waterproof zipper 2 includes, referring to a manufacturing equipment for waterproof zipper 4 illustrated in FIG. 4 together, steps as follows.

Figure 4:
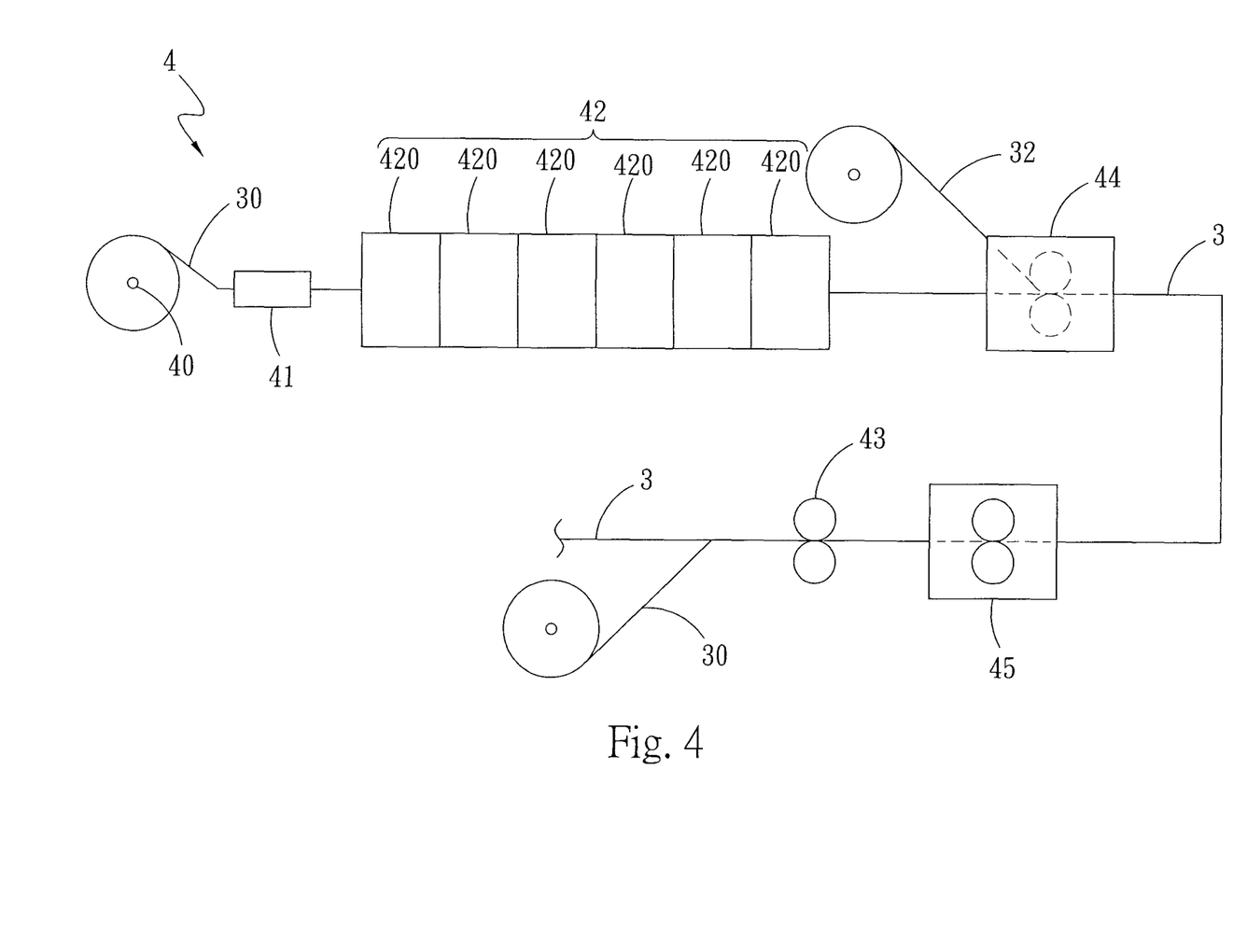
FIG. 4 is a diagram (1) of equipment for the method for manufacturing waterproof zipper of the present invention.

In Step A, there is provided a release paper 30, a release side 300 of which is oriented upwards and formed with a glossy surface or matte surface, or pressed with indents or embossments, such as figures, patterns, trademarks and characters. The release paper 30 is referred to a wound release paper, and the release paper 30 is located on a rotating mount 40. One end of the wound release paper 30 is dragged to a first drawing device 43 previously. Afterwards, the wound release paper 30 may be processed continuously only if the release paper 30 is hauled by the first drawing device 43.

In Step B, a liquid hot melt glue 31 is applied to the release side 300 of the release paper 30 by means of an application device 41.

In Step C, a heating procedure is performed on the liquid hot melt glue 31 to activate the liquid hot melt glue 31 by means of a heating device 42;

In Step D, a zipper 32 is provided, the zipper 32 particularly being referred to a zipper in which zipper teeth 320 are located on the same side of a zipper tape 321 after being engaged together.

In Step E, a hot rolling procedure is performed on the zipper 32, the release paper 30 and the liquid hot melt glue 31, in which one side of the zipper tape 321 provided with the zipper teeth 320 is oriented upwards, while the other side of the zipper tape 321 without the zipper teeth 320 is oriented downwards and bound to the liquid hot melt glue 31 by hot rolling, the liquid hot melt glue 31 being formed as a waterproof layer.

Figure 5:
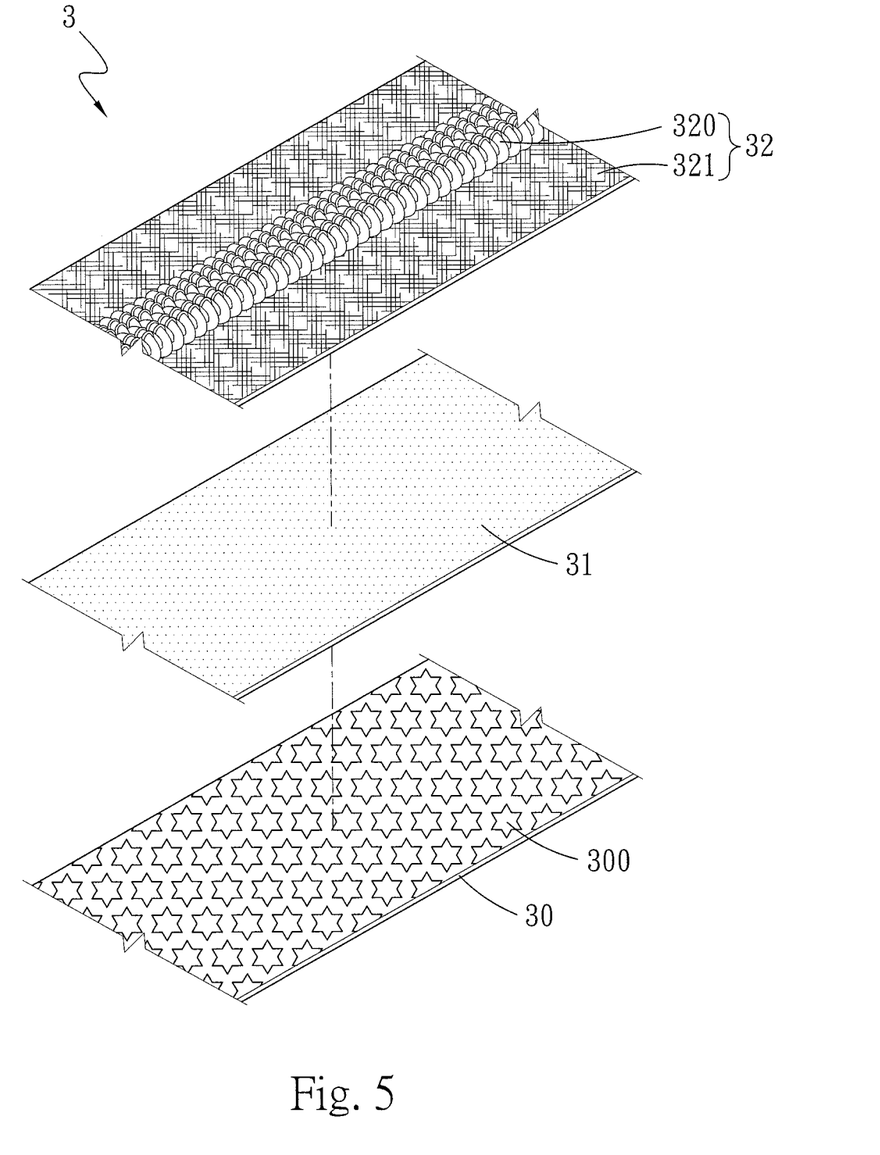
FIG. 5 is a perspective exploded view of a waterproof zipper product of the present invention.
Figure 6:
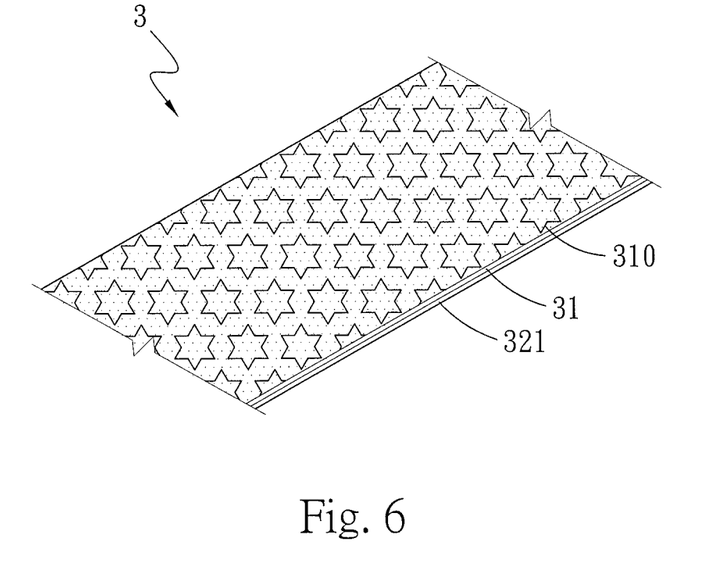
FIG. 6 is a perspective assembled view of the waterproof zipper product of the present invention.

Moreover, in Step F, the release paper 30 is peeled off, so as to form a glossy surface, a matted surface, figures, patterns, trademarks, or characters on a surface 310 of the waterproof layer contacted with the release side 300. Afterwards, the release paper 30 and the product 3 with the release paper 30 being peeled off are wound to be collected for the following processing. In other words, the product 3 includes the waterproof layer formed by the liquid hot melt glue 31, and the zipper 32, the zipper 32 including the zipper tape 321 and the zipper teeth 320.

Specifically, the shape, such as a glossy surface, a matte surface, figures, patterns, trademarks, characters and etc., required by the client, is firstly formed on the release side 300. Afterwards, the release paper 30 and the liquid hot melt glue 31 are provided on one side of the zipper tape 321 without the zipper teeth 320. Next, the heating procedure is performed on the liquid hot melt glue 31 so as to activate the liquid hot melt glue 31, and the release paper 30 is peeled off after the liquid hot melt glue 31 is cooled down. Thus, the shape, such as a glossy surface, a matte surface, figures, patterns, trademarks, characters and etc., is formed on the surface 310 of the liquid hot melt glue 31 contacted with the release side 300. Thereby, the zipper with the configuration required by the client is completed.

Subsequently, more glue is prone to be permeated into the fiber fabric of the zipper tape 321 when the liquid hot melt glue 31 is heated to activate, such that the adhesive effect and the waterproof effect between the waterproof layer formed by the liquid hot melt glue 31 and the zipper tape 321 may be enhanced. Moreover, it is more comfortable for a user wearing the clothing mounted with the product 3, because the product 3 without the adhesive layer is softer in the present invention.

In Step E, referring to FIGS. 4 and 10 again, the hot rolling procedure is performed by a first hot rolling device 44 and a second hot rolling device 45 for hot rolling the zipper 32, the release paper 30 and the liquid hot melt glue 31. Moreover, the zipper 32 and the release paper 30 are turned over firstly, such that one side of the zipper tape 321 provided with the zipper teeth 320 is oriented downwards, while the other side of the zipper tape 321 without the zipper teeth 320, the release paper 30 and the waterproof layer are oriented upwards, between the first hot rolling device 44 and the second hot rolling device 45. In this connection, hot rolling is specially performed on the liquid hot melt glue 31 and the zipper 32 twice by means of the first hot rolling device 44, overturning procedure and the second hot rolling device 45 in turn, for preventing the displacement generated when the liquid hot melt glue 31 is stuck to the zipper tape 321, and thus the defect of wrinkle or poor sturdiness.

Figure 7:
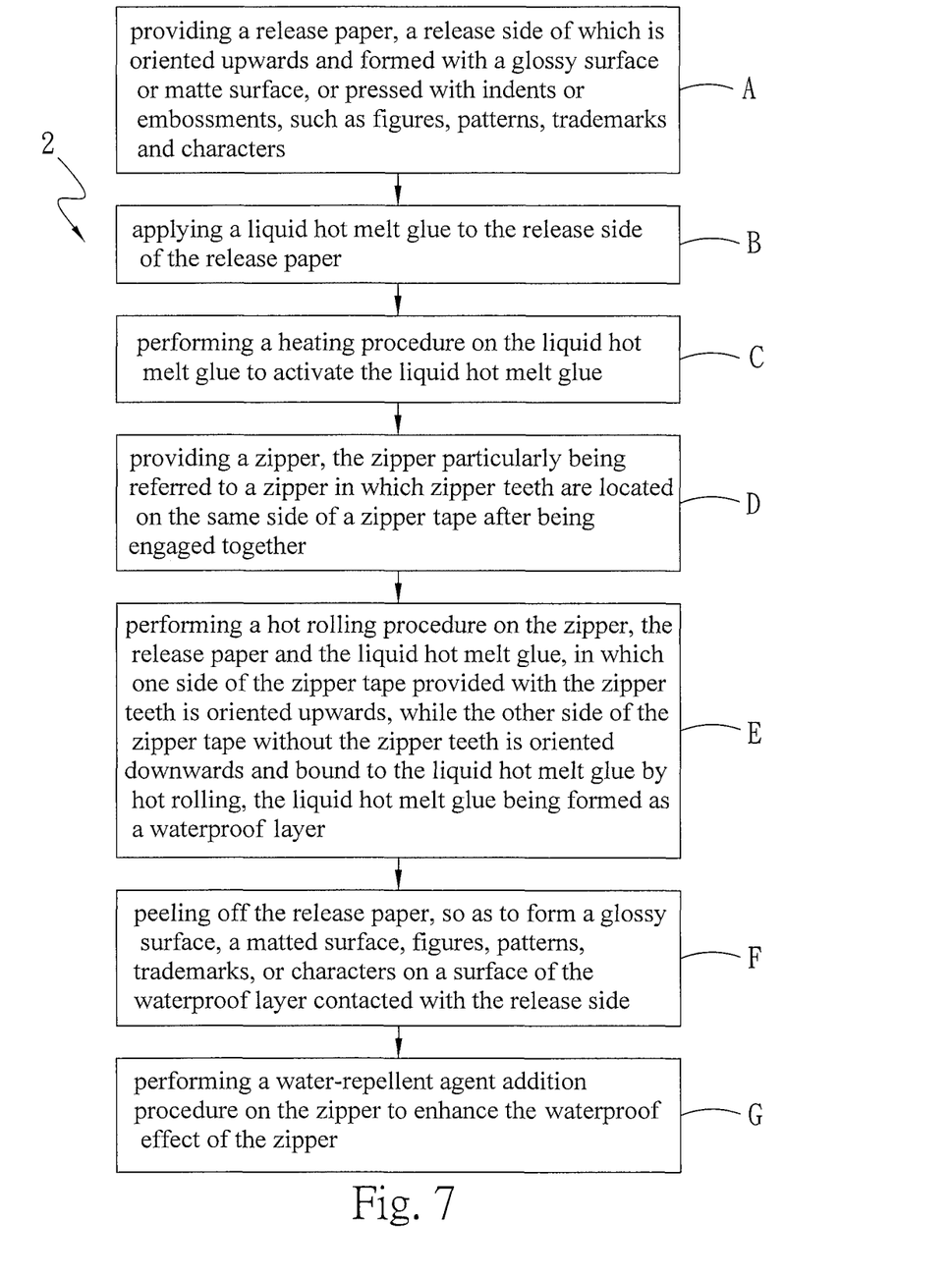
FIG. 7 is a flow chart (2) of the method for manufacturing waterproof zipper of the present invention.
Figure 9:
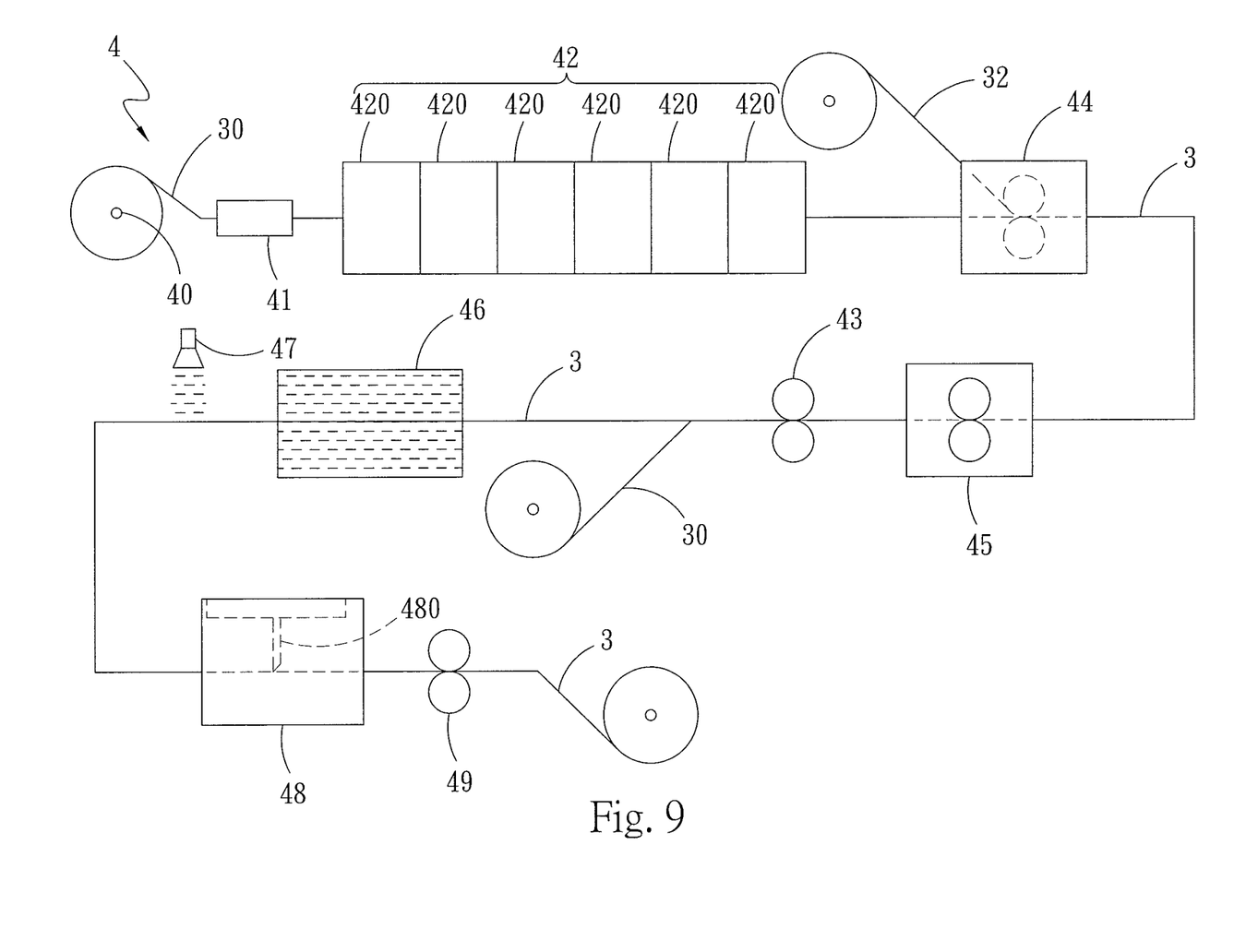
FIG. 9 is a diagram (2) of equipment for the method for manufacturing waterproof zipper of the present invention.
Figure 10:
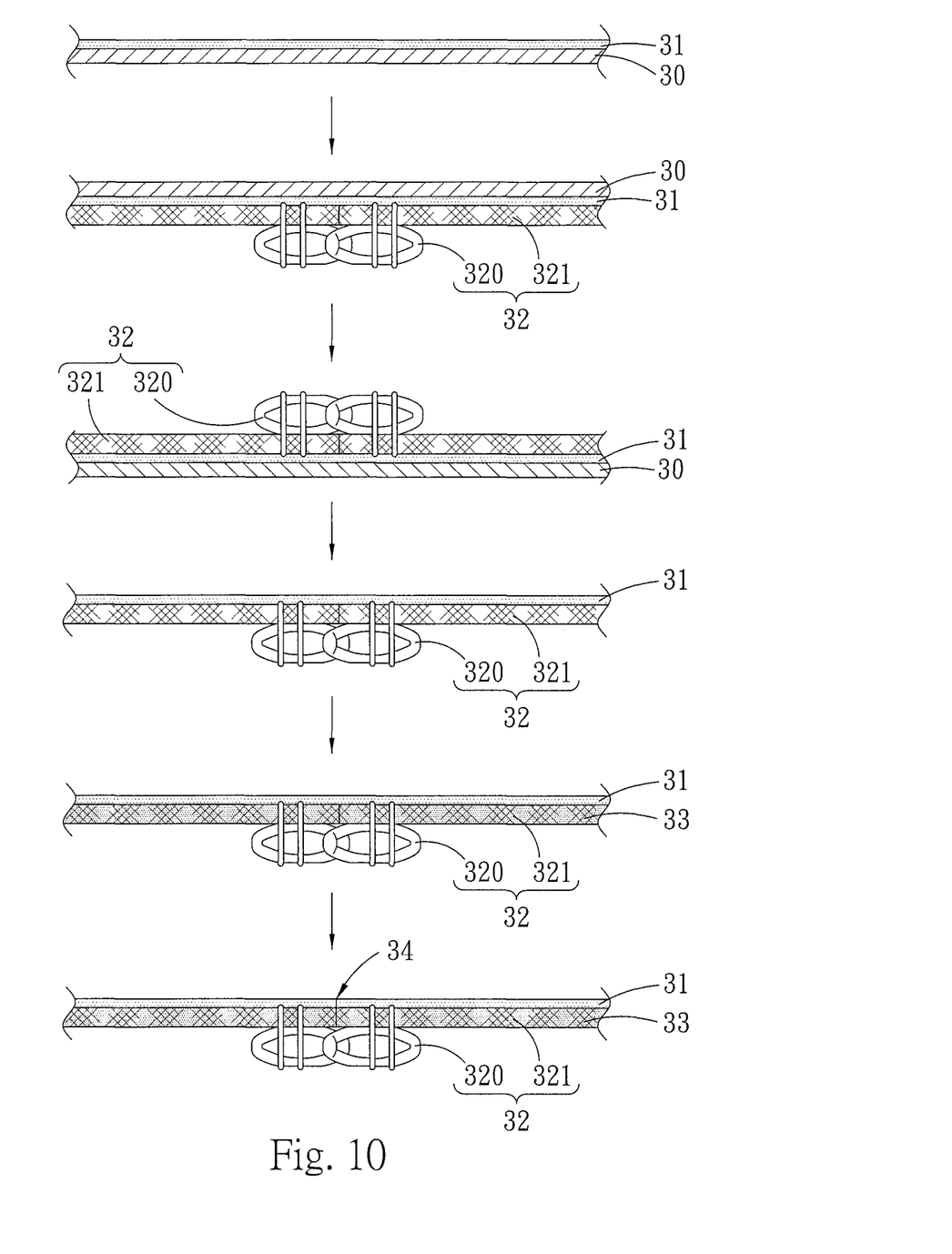
FIG. 10 is a plan view of the waterproof zipper product of the present invention.

After Step F, referring to FIGS. 7, 9 and 10 further, the method further includes Step G: performing a water-repellent agent addition procedure on the zipper 32 to enhance the waterproof effect of the zipper 32. In the water-repellent agent addition procedure of the Step G, a water-repellent agent immersion device 46 and a water-repellent agent spraying device 47 are provided for the addition of a water-repellent agent layer 33 to the zipper 32. In this way, the zipper 32 is enclosed by the water-repellent agent layer 33 so as to enhance the waterproof effect of the zipper 32.

Figure 8:
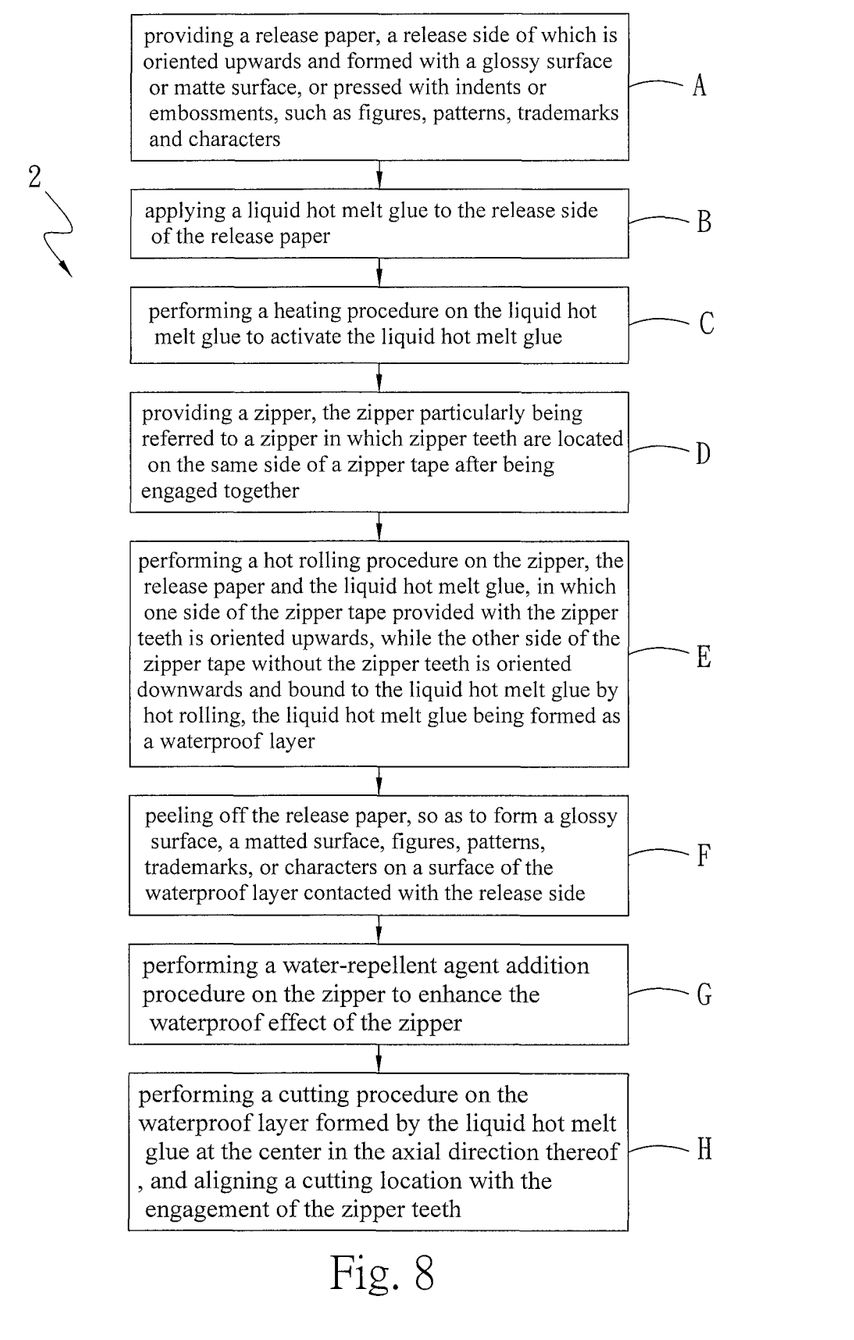
FIG. 8 is a flow chart (3) of the method for manufacturing waterproof zipper of the present invention.

After Step G, referring to FIGS. 8 to 10, the method further includes Step H: performing a cutting procedure, by means of a cutting device 48, on the waterproof layer formed by the liquid hot melt glue 31 at the center in the axial direction thereof. Moreover, a cutting location 34 is aligned with the engagement of the zipper teeth 320. Afterwards, the product 3 is drawn by a second drawing device 49 and then wound to be collected. In the cutting procedure, it is then convenient for the cutting device 48 with a cutting edge portion 480 oriented downwards to cut the zipper tape 321, because the zipper 32 and the liquid hot melt glue 31 are turned over to orient the zipper tape 321 upwards by means of the overturning procedure prior to the cutting procedure.

Furthermore, referring to FIGS. 4 and 9 again, six heating boxes 420, having heating temperature set at 55° C., 55° C., 60° C., 85° C., 60° C. and 55° C., respectively, are provided in the heating device 42, when the liquid hot melt glue 31 is provided as cryogenic liquid polyurethane (PU) glue in the embodiment of the present invention. In the present invention, heating temperature for slowly progressive activation is specifically adopted to heat the liquid hot melt glue 31, for preventing abrupt and significant change in the heating temperature and thus the effect on the activation. In addition, the zipper teeth 320 are provided as nylon teeth, metal teeth or plastic steel teeth, but not limited thereto.

To sum up, the features of the present invention are as follows.

1. More glue is prone to be permeated into the fiber fabric of the zipper tape 321 when the liquid hot melt glue 31 is heated to activate, such that the adhesive effect and the waterproof effect between the waterproof layer formed by the liquid hot melt glue 31 and the zipper tape 321 may be enhanced.

2. In addition, it is more comfortable for a user wearing the clothing mounted with the product 3, because the product 3 without the adhesive layer is softer in the present invention.

What is claimed is:

1. A method for manufacturing waterproof zipper, comprising the steps of:
   Step A: providing a release paper, a release side of which is oriented upwards and formed with a glossy surface or matte surface, or pressed with indented or embossed figures, patterns, trademarks or characters;
   Step B: applying a liquid hot melt glue to said release side of said release paper;
   Step C: performing a heating procedure on said liquid hot melt glue to activate said liquid hot melt glue, wherein six heating boxes, each operating at an individual heating temperature, are arranged in succession based on the individual heating temperatures of 55° C., 55° C., 60° C., 85° C., 60° C., and 55° C., the six heating boxes are provided in said heating procedure, so that said liquid hot melt glue is uniformly activated;
   Step D: providing a zipper, said zipper comprising a zipper tape and zipper teeth, wherein each one of the zipper teeth are engaged with a corresponding another one of the zipper teeth and each of the zipper teeth are located on a first side of the zipper tape;
   Step E: performing a hot rolling procedure on said zipper, said release paper and said liquid hot melt glue to harden said liquid hot melt glue, in which the first side of said zipper tape provided with said zipper teeth is oriented upwards, while a second side of said zipper tape without said zipper teeth is oriented downwards and bound to said liquid hot melt glue by the hot rolling procedure, said liquid hot melt glue being formed as a waterproof layer; and
   Step F: peeling off said release paper, so as to form a glossy surface, a matted surface, figures, patterns, trademarks, or characters on a surface of said waterproof layer contacted with said release side.

2. The method for manufacturing waterproof zipper according to claim 1, wherein said zipper teeth are provided as nylon teeth, metal teeth or plastic steel teeth.

3. The method for manufacturing waterproof zipper according to claim 1, wherein said liquid hot melt glue is provided as polyurethane (PU) liquid glue.

4. The method for manufacturing waterproof zipper according to claim 1, wherein said hot rolling procedure in Step E is performed by a first hot rolling device and a second hot rolling device for hot rolling said zipper, said release paper and said liquid hot melt glue, as well as said zipper and said release paper are turned over firstly, such that one side of said zipper tape provided with said zipper teeth is oriented downwards, while the other side of said zipper tape without said zipper teeth, said release paper and said waterproof layer are oriented upwards, between said first hot rolling device and said second hot rolling device.

5. The method for manufacturing waterproof zipper according to claim 4, further comprising Step G: performing a water-repellent agent addition procedure on said zipper to enhance the waterproof effect of said zipper after Step F.

6. The method for manufacturing waterproof zipper according to claim 5, wherein said water-repellent agent addition procedure in Step G provides a water-repellent agent immersion device and a water-repellent agent spraying device for the addition of a water-repellent agent layer to said zipper.

7. The method for manufacturing waterproof zipper according to claim 5, further comprising Step H: performing a cutting procedure on said waterproof layer formed by said liquid hot melt glue at a center in an axial direction thereof and aligning a cutting location with an engagement of said zipper teeth after Step G.

* * * * *